United States Patent
Arbusto et al.

(10) Patent No.: US 8,260,765 B2
(45) Date of Patent: Sep. 4, 2012

(54) SYSTEM AND METHOD FOR A TAGGING SERVICE

(75) Inventors: Maria Arbusto, Brooklyn, NY (US);
Robi Brunner, Cambridge, MA (US);
Thomas J. Burris, Brooklyn, NY (US);
Melania Degeratu, South Plainfield, NJ (US); James R. Doran, New Milford, CT (US); Sarah N. Goldman, Brooklyn, NY (US); Brian D. Goodman, New York, NY (US); Brian P. Olore, Middletown, NJ (US); Aroopratan D. Pandya, Hopewell Junction, NY (US); Chen Shu, Southbury, CT (US); Matthew S. Starr, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 12/013,824

(22) Filed: Jan. 14, 2008

(65) Prior Publication Data
US 2009/0182804 A1 Jul. 16, 2009

(51) Int. Cl.
*G06F 17/30* (2006.01)
(52) U.S. Cl. ..................................... 707/709
(58) Field of Classification Search ............ None
See application file for complete search history.

(56) References Cited

U.S. PATENT DOCUMENTS

| | | | |
|---|---|---|---|
| 7,185,088 B1* | 2/2007 | Joy et al. | 709/224 |
| 7,321,889 B2* | 1/2008 | Smadja et al. | 1/1 |
| 7,668,821 B1* | 2/2010 | Donsbach et al. | 705/27 |
| 2002/0169875 A1* | 11/2002 | Furui et al. | 709/225 |
| 2003/0018540 A1* | 1/2003 | Volpi et al. | 705/26 |
| 2007/0078832 A1* | 4/2007 | Ott et al. | 707/3 |
| 2007/0130125 A1* | 6/2007 | Holte | 707/3 |
| 2007/0174247 A1* | 7/2007 | Xu et al. | 707/3 |
| 2007/0233708 A1* | 10/2007 | Baio et al. | 707/100 |
| 2008/0040674 A1* | 2/2008 | Gupta | 715/745 |
| 2008/0046415 A1* | 2/2008 | Henkin et al. | 707/3 |
| 2008/0195483 A1* | 8/2008 | Moore | 705/14 |
| 2009/0063491 A1* | 3/2009 | Barclay et al. | 707/9 |
| 2009/0144240 A1* | 6/2009 | Singh et al. | 707/3 |
| 2009/0235187 A1* | 9/2009 | Kim et al. | 715/760 |
| 2010/0179876 A1* | 7/2010 | Holte | 705/14.54 |
| 2010/0185702 A1* | 7/2010 | Friebel et al. | 707/805 |
| 2010/0332325 A1* | 12/2010 | Holte | 705/14.54 |
| 2011/0010384 A1* | 1/2011 | Luo et al. | 707/769 |

* cited by examiner

*Primary Examiner* — Bai D. Vu
(74) *Attorney, Agent, or Firm* — Cantor Colburn LLP; Louis Percello (57) ABSTRACT

Disclosed is a service for displaying custom information. The service includes establishing a data connection to at least one data source, storing specific information via the data connection in the data source, and providing a data crawler to crawl said at least one data source using the stored information. The results are pushed from the data crawler to an end user for displaying a combination of the stored information and the at least one data source.

13 Claims, 7 Drawing Sheets

SYSTEM AND METHOD FOR A TAGGING SERVICE

BACKGROUND OF THE INVENTION

With the high level of focus on Web 2.0, many web-based applications have introduced the notion of tagging—enabling users to associate keywords with other data. For example, solutions such as Del.icio.us offer web users the ability to bookmark web content. Upon identifying the item to be bookmarked, the user optionally "tags" the URL with keywords. Whereas bookmarking is oriented toward saving references to web sites so they can be found later, the purpose of tagging is more general. Tagging is an act of data classification. It supports data recollection, association, and analysis that can be performed to extrapolate information about the items tagged. Current art enables the activity of tagging in social web spaces.

BRIEF SUMMARY OF THE INVENTION

According to one embodiment of the present invention is a service for displaying custom information. The service includes establishing a data connection to a database, storing specific information via the data connection in the database, and providing a data crawler to crawl data sources using the registered information. The results are pushed from the data crawler to an end user for displaying a combination of the registered information and the data sources.

According to another embodiment of the present invention, the service provides pushed results as normalized tagged data.

According to still another embodiment of the present invention, the service establishes the data connection via a web browser.

According to yet another embodiment of the present invention the service provides the pushed results within a widget as part of within a browser.

According to still another embodiment of the present invention, the service provides the normalized tagged data within a widget as part of within a browser.

According to another embodiment of the present invention, the service provides the normalized tagged data from a third party data source.

DETAILED DESCRIPTION OF THE INVENTION

Disclosed is an embodiment that uses a common service for aggregating the tagging data and for providing tagging functionality across large numbers of social web spaces. Furthermore, other embodiments of the invention provides normalization services across the data, so that, for example, the tag "Mouse" is related to the tag "mice". The tagging data is then exposed via a variety of services and widgets enabling the benefits of data federation—i.e., the physical or logical collection of tagging data from multiple sources or social web spaces. An embodiment of the present invention disclosed is in the domain of web applications, data aggregation, service-oriented architecture and social software. The invention is a system and method for providing a service that a) enables web applications to collect and display tagging data on their sites with access control using services or widgets (application services)

b) enables aggregation of tagging data c) normalizes tags

A centralized service provides a browser-based interface for users of a web site to enter tags associated with Uniform Resource Locators (URLs). The client is loaded from the service and rendered via the browser so that it appears on the third party Web Site. Users' tags are stored by the service in such a way that allows each Web Application or Web Site to have a distinct collection of tags with configurable Access Control applied to each. Tags are normalized across all collections, meaning they are transformed as necessary such that tag variants from one third party to another third party are associated with a single, normalized form of the tag. The centralized service also provides a browser-based interface for Web Applications and Web Sites to surface the tagging data that has been entered on their sites. Finally, a mechanism for searching the central tagging repository—also subject to the configured Access Control—utilizes the normalized form of tags to find URL matches for tag variants across all tag collections.

Still another embodiment of the present invention is the system and method of tag aggregation, including tag normalization (i.e. any processing of the tag), optionally maintaining application specific access control to the data, and offering data or GUI services for accessing and interacting with the data.

Another aspect of another embodiment has the ability to partition the data based on the remote system originating the tagging data is fundamental to the service orientation of the invention. The invention as described includes centrally managed components that are extensions of the tagging service.

Figure 1:
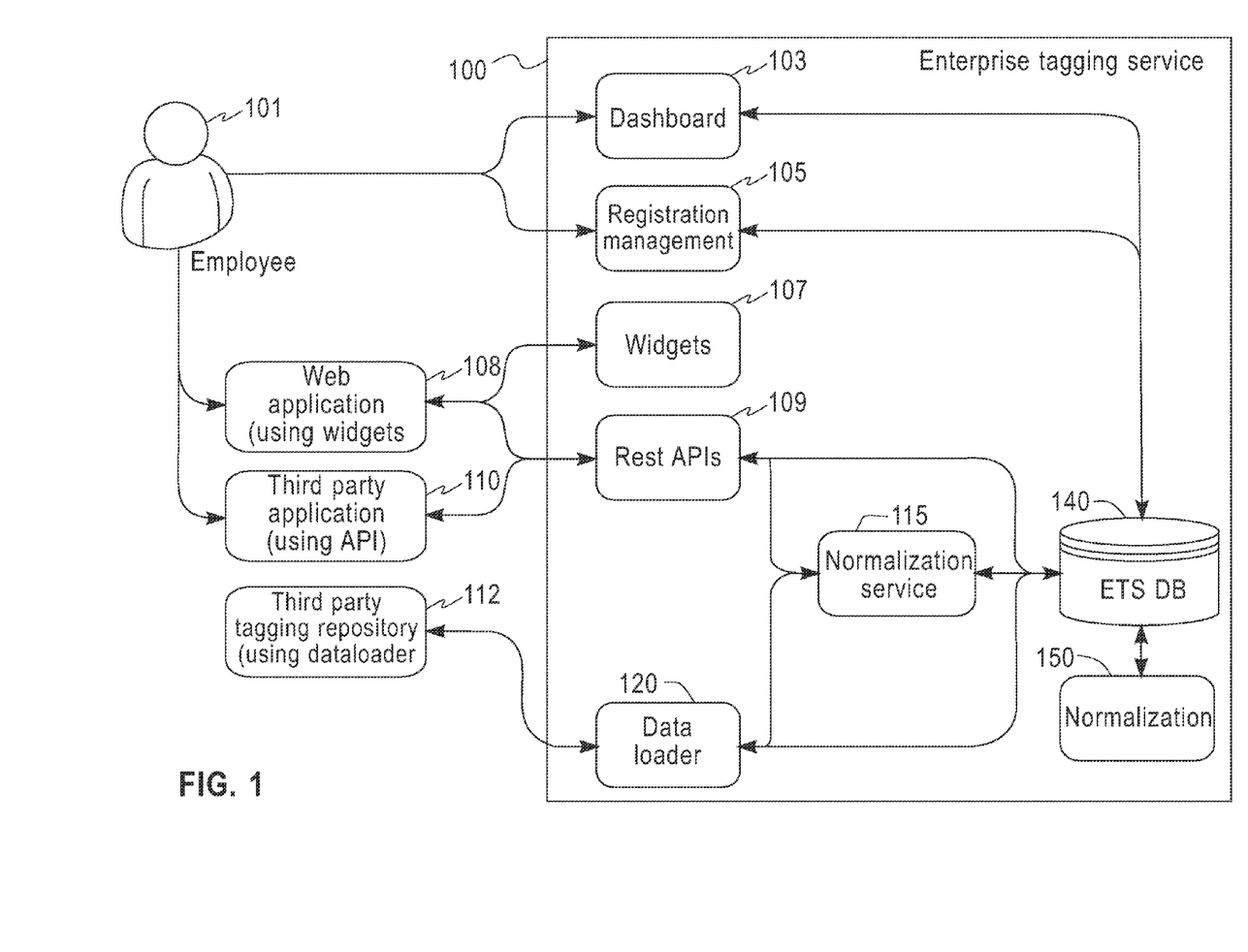
FIG. 1 shows an Enterprise Tagging Service according to an embodiment of the present invention.

There are two different kinds of users 101 of this system 100. A Site Owner is an owner of a third party site, web application, or social web space. A User is a consumer of the third party site, web application, or social web space.

A Site Owner engages with the Registration Management 105 component of the Enterprise Tagging Service (ETS) 100 to register their site with the ETS system. When they do so, they specify Access Control settings for the data that ETS will collect for their site. Specifically, they can set Read and Write access to the data. Based on this information, the system surfaces the site data accordingly. One could imagine a variety of access control systems to address this need, this is simply one method.

The registration process provides the Site Owner with a Site ID by which data collected from the third party site is segmented from data collected from other third party sites. When Users tag pages on the third party site, the information collected by the ETS is associated with the Site ID. This allows for the scoping of data Reads and data Writes via the ETS to the Site ID of a third party site.

The third party Site Owner can enable Users to tag pages on their site in a variety of ways. They can embed ETS-provided Widgets on their site's pages or they can create their own tagging interface that interacts with the ETS REST API. When Users 101 view the third party site's pages, they interact with the provided mechanisms to tag the page. The act of tagging implicitly associates a) the tag(s) entered by the user with b) the current page's URL, c) (optionally) the identity of the user doing the tagging, and d) the Site ID issued by the ETS Registration Management 105 component.

Alternately, the third party Site (third Party tagging repository) may have a full-service tagging component already part of their application. That is, the site may have its own tagging interface (to enable users 101 to tag) and tagging repository (to store the tag-related data locally to the application). The ETS Data Loader provides the ability to load data from such sites such that the tagging data collected by the third party site can be aggregated in a central place in the ETS system. The third party application makes its tagging data available over HTTP in any well-formed XML format. When registering the site via ETS Registration Management 105, the Site Owner can provide a URL and other information to allow the ETS Data Loader 120 to load data from their site into the ETS DB. The loaded data is associated with the Site ID issued by the ETS Registration Management component.

Tagging data added to the ETS repository—either via the Widgets 107, the REST API 109, or the Data Loader 120—undergoes processing before being added to the ETS DB (i.e., the ETS data repository). The raw tags entered by Users are transformed by the ETS Normalization Service 115. This service ensures that variations of tags are associated with one another so that, for example, the tag "CAT," "cat," "caat," and "cats" may be associated with one another.

Tagging data from multiple third party Sites are all stored in a single physical or logical (i.e., federated) repository, the ETS DB 140.

Normalization 150 in relation to tagging is important because tagging is a social activity, meaning a) more than one user 101 has the access to tag a page; and b) there are no (or relatively minor) restrictions on what constitutes a "tag". A tag is just text. This means every user 101 can potentially enter a different version of what is essentially the same word. When Users 101 consume the tag data by, for example, searching via the ETS Dashboard 103 for URLs tagged with a given tag, it is crucial that URLs matching all variants of that tag be returned in the search results. This is especially true of a system such as the ETS system described here, in which disparate Sites with varying user populations feed into a central tag repository.

The ETS Dashboard 103 and ETS tag search in general, first normalizes the search terms and performs the search using the normalized terms. This ensures that any URLs tagged with any variants of the search terms are located.

ETS Normalization 150 is an asynchronous process that analyzes the tag data in the ETS DB to improve the tag normalization results. It does so by learning from the tag data present in the repository. For example, if a page is tagged by a user 101 with "NeuralNets" (one of many commonly used syntaxes for tagging) the tag may, initially, be normalized to "neuralnets." However, if another user tags a (potentially) different URL with "neural," for example, the next time the Normalization 150 process runs, it will recognize that "neural" is a word used by other taggers and might re-normalize "neuralnet" to "neural_net". This is an example of how the asynchronous Normalization 150 process can learn from the tagging data to improve its normalization of tags.

Users consume tag data in a variety of ways. The most obvious way is by using a search site, such as the ETS Dashboard 103 as described above. Other examples are:

Via the REST API, a user may request an RSS-formatted feed of URLs tagged by a particular user Via the REST API, a user may request an Atom-formatted feed of URLs associated with a particular tag The ETS Widgets 107, which are loaded on a particular page 108, could surface URLs related to the current page, where the "related" is determined by analysis of the tagging data. For example, a page's tags (in their normalized form preferably) can be used to find and surface pages in the repository that have similar tags.

A Widget 107 might surface a "cloud" of tags scoped to either a Site ID, multiple Site IDs, or all publicly-readable Site IDs (as defined by the configured Access Control for each third party site at registration time)

All methods by which tagging data is surfaced are subject to the Access Control levels configured for the Site ID the data is associated with. Furthermore, because Site IDs enable tagging data to be scoped to a particular application, all Reads can be scoped to one Site ID, many Site IDs, or all publicly-readable (as defined by the configured Access Control for each third party site at registration time) Site data in the ETS DB 140.

As mentioned, part of the power of aggregating Tagging data across multiple third party sites is that useful analytics can be performed on a large and disparate corpus of data. The ETS Dashboard 103 surfaces aspects of these analyses, such as statistics related to usage, data connected by common metadata such as a URLs tagged by Users that tend to use similar tags, etc. These analyses are potentially extremely powerful.

Embodiments of the present invention uses other applications 110, 112 that take advantages of the APIs 109 and the data loader 120, respectively. Other embodiments of the present invention will now be described.

Figure 2A:
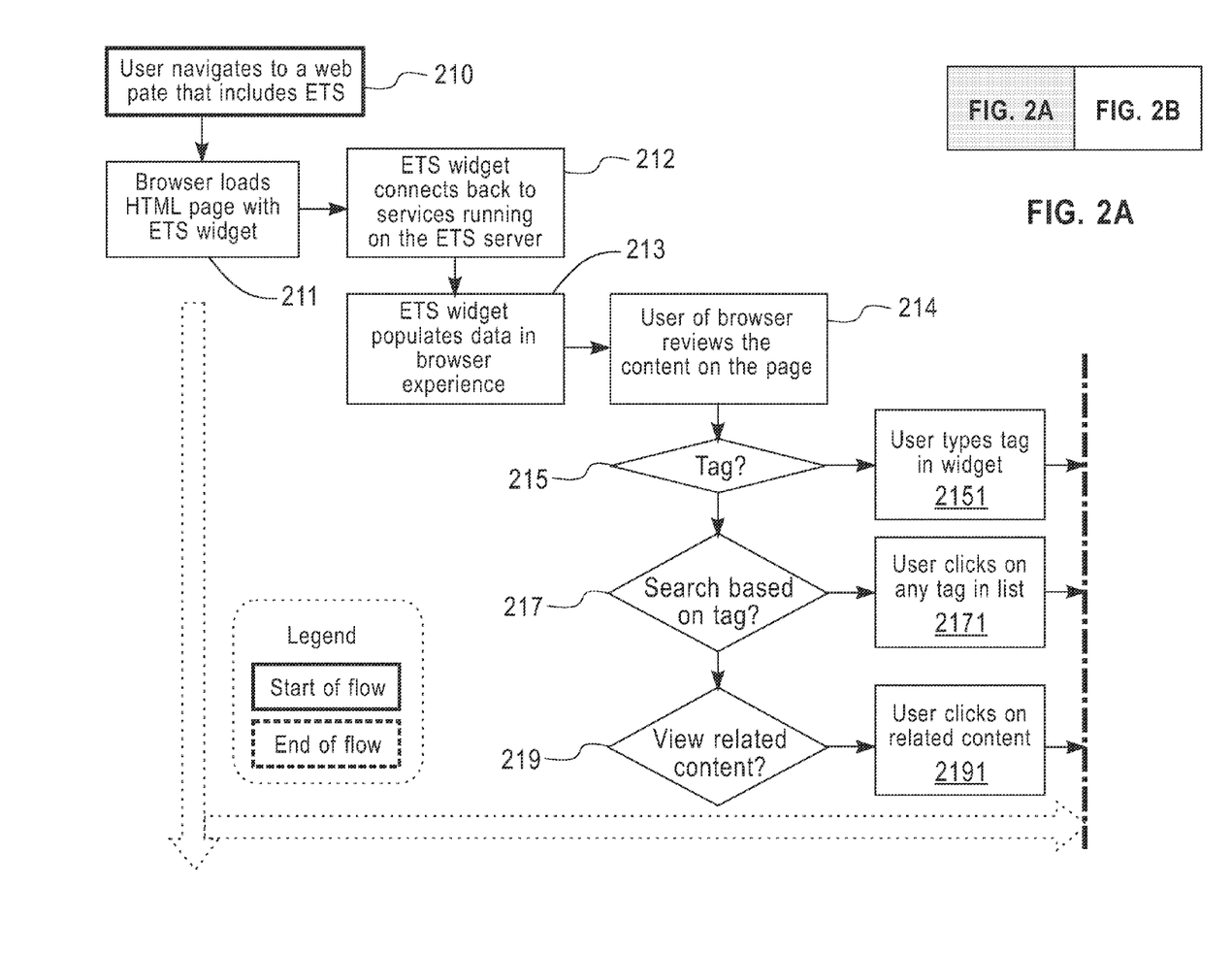
FIG. 2 shows an action flowchart for an Enterprise Tagging Service according to an embodiment of the present invention.
Figure 2B:
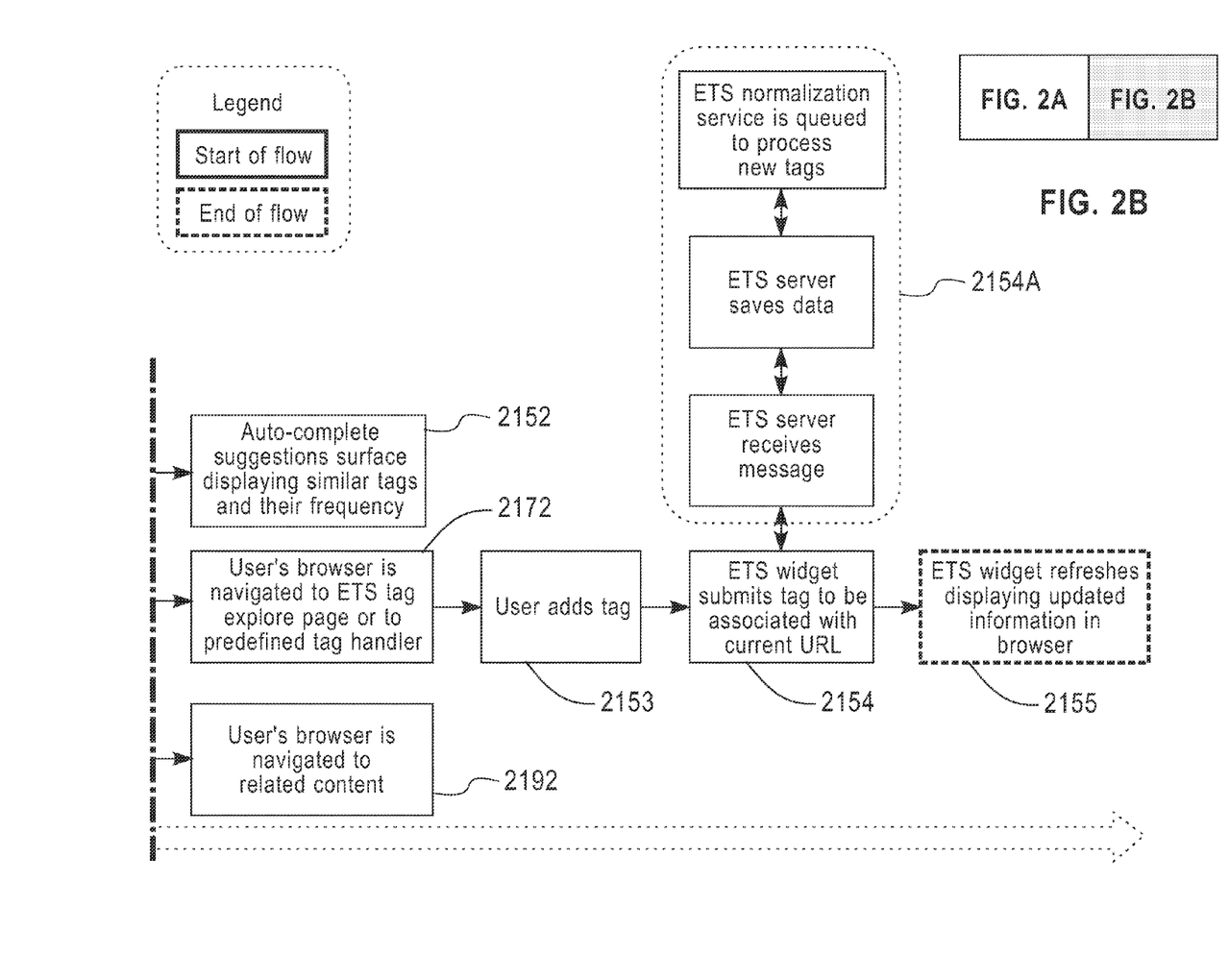

When the invention is viewed from an End-user perspective the flowing event flow could be followed, see FIG. 2.

End-User Event Flow

A user 210 navigates to a web page that includes a markup that instructs the browser to load the Enterprise Tagging Service (ETS) widget. Browser 211 loads HTML page with ETS widget. The ETS Widget script connects back to services running on the ETS server. This server may be simultaneously serving the widget to multiple users viewing multiple web pages across multiple distinct sites. Furthermore, the loading of the pages may require a password log-in procedure. ETS Widget populates data 213 in browser experience. This data includes tags that the user and/or others have assigned to the current web page as well as related content, where the related content is determined by the tags assigned by users to the current page. User reviews the content on the page 214. User can now interact with the ETS Widget and the content contained therein.

There are three potential actions a user can take at this point in the ETS process. If the user wants to tag the current page, the following actions can be taken.

Action 2151—User types tag in ETS widget.

Action 2152—Complete suggestions surface, served by the central ETS service, displaying tags matching the letters the user has typed to existing tags and their frequencies in the central ETS repository. This action may be done by in automated step.

Action 2153—User adds tag by clicking a control in the widget, such as a "submit" button.

Action 2154—ETS Widget submits tag to be associated with current URL.

Action 2154A—As a subset of the Action 2154, the ETS system may include the following sub-actions: An ETS normalization service is queued to process new tags after receiving ETS server saved data from a message. This sub-action can be often scheduled to run on a periodic basis or queued on demand. This sub-action may also require a security feature of providing an ID and password. This ID may identify the owner of the submitted tags.

Action 2155—ETS Server code persists the association of the a) the user; b) the URL; and c) the tag. Thereby allowing the ETS Widget to refreshes and display updated information in browser.

Still referring to FIG. 2, if the user wants to search 217 the ETS repository for URLs relating to a tag the following sub-actions could be performed.

Action 2171—User clicks on any tag in list or any displayed area.

Action 2172—User's browser is navigated to ETS tag explore page or to predefined tag handler. A tag handler is web end point that give the parameter tag=<tag name> will offer the view of the tag experience, for example a page of search results based on the chosen tag.

A third action 219 a user can take if they want to view related content as associated with the data the ETS widget displays.

Action 2191—User clicks on related content link.

Action 2192—User's browser is navigated to the related content. Optionally, the user's browser is directed to the ETS server or second server before redirecting to the related content. This might be done to perform click analytics etc. As another feature of the present embodiment, the resulting displayed related content brings the user back to step 210.

Tag Crawler/Data Loader/Data Push

Figure 3:
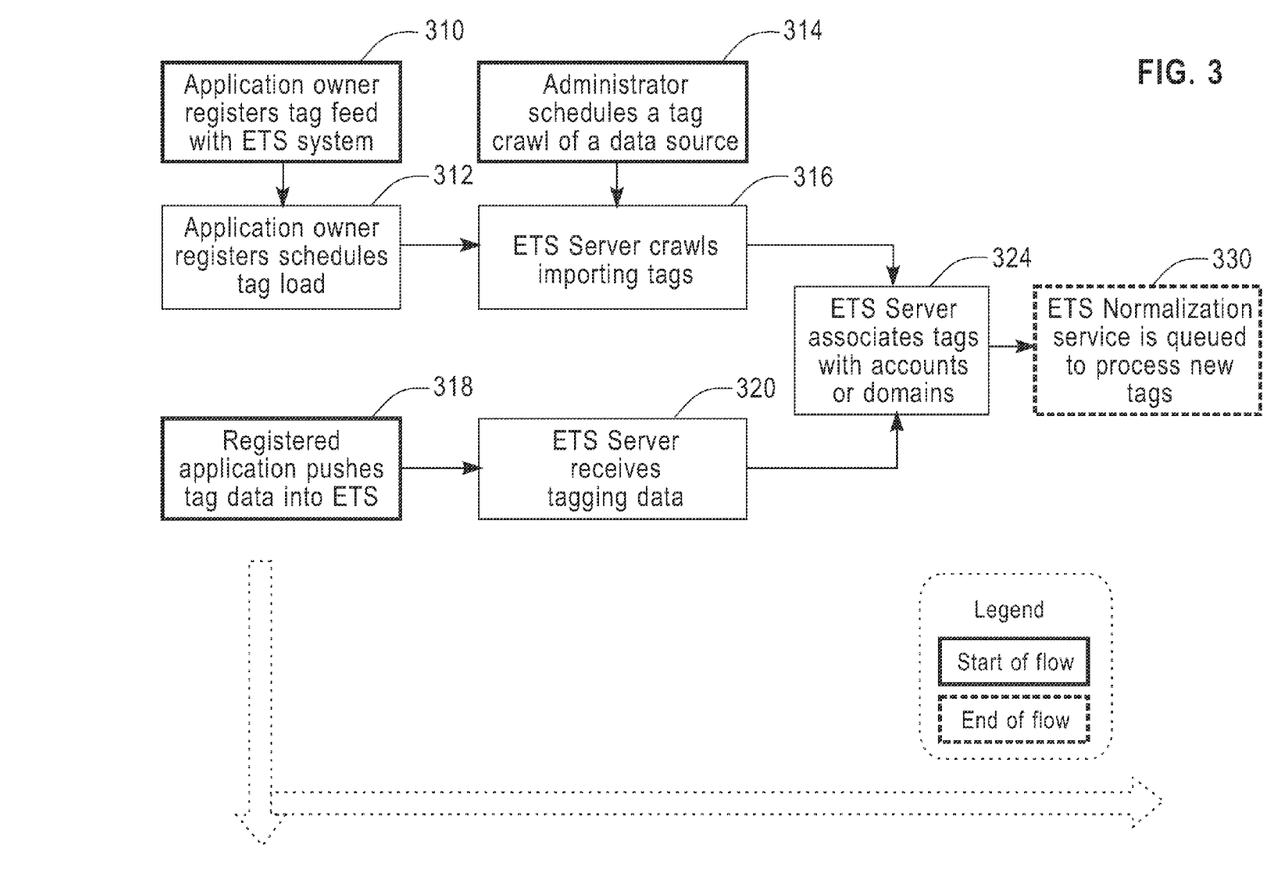
FIG. 3 shows an action flowchart for an Enterprise Tagging Service according to an embodiment of the present invention.

As shown in FIG. 3, the present embodiment of the invention highlights the steps for the ETS system to act as a tag crawler, data loader or data pusher.

There are two ways that data can get loaded into ETS: either pulled by ETS from the remote application that is a source of tagging data or pushed by the remote application.

ETS Data PULL From Remote Tag Repository

Action 310, owner/administrator of an application remotely collects tag data registers tag feed with an ETS system. The "tag feed" is an instance of part, or all, of the remote application's tagging data in some form, such as XML.

Action 312, application owner schedules tag load.

Action 314, ETS Server initiates (either on-schedule or through receiving a load request via its API) a tag crawl of remote application's data source. The data source may be any one of a database, URL, domain, file system, etc.

Action 316, ETS Server crawls tag data.

Action 324, ETS Server associates tags with accounts or domains. This ensures that the remote application's data is associated with the remote application in the ETS repository.

Action 330, ETS Normalization service is queued to process new tags. This step updates the normalized values of incoming tags based on any new tag data received. It is part of how normalization learns from incoming data. Normalization may be scheduled to run on a periodic basis. Optionally it can be queued on demand.

FIG. 3 further discloses a tag data pusher. The remote tag repository PUSHes tags to ETS via the following actions.

Action 318, Registered application pushes tag data into ETS via ETS API.

Action 320, ETS Server receives tagging data.

Action 324, ETS Server associates tags with accounts or domains. This ensures that the remote application's data is associated with the remote application in the ETS repository.

Action 330, ETS Normalization service is queued to process new tags. This step updates the normalized values of incoming tags based on any new tag data received. It is part of how normalization learns from incoming data. Normalization is often scheduled to run on a periodic basis. Optionally it can be queued on demand.

Restricted Data Flow

Figure 4A:
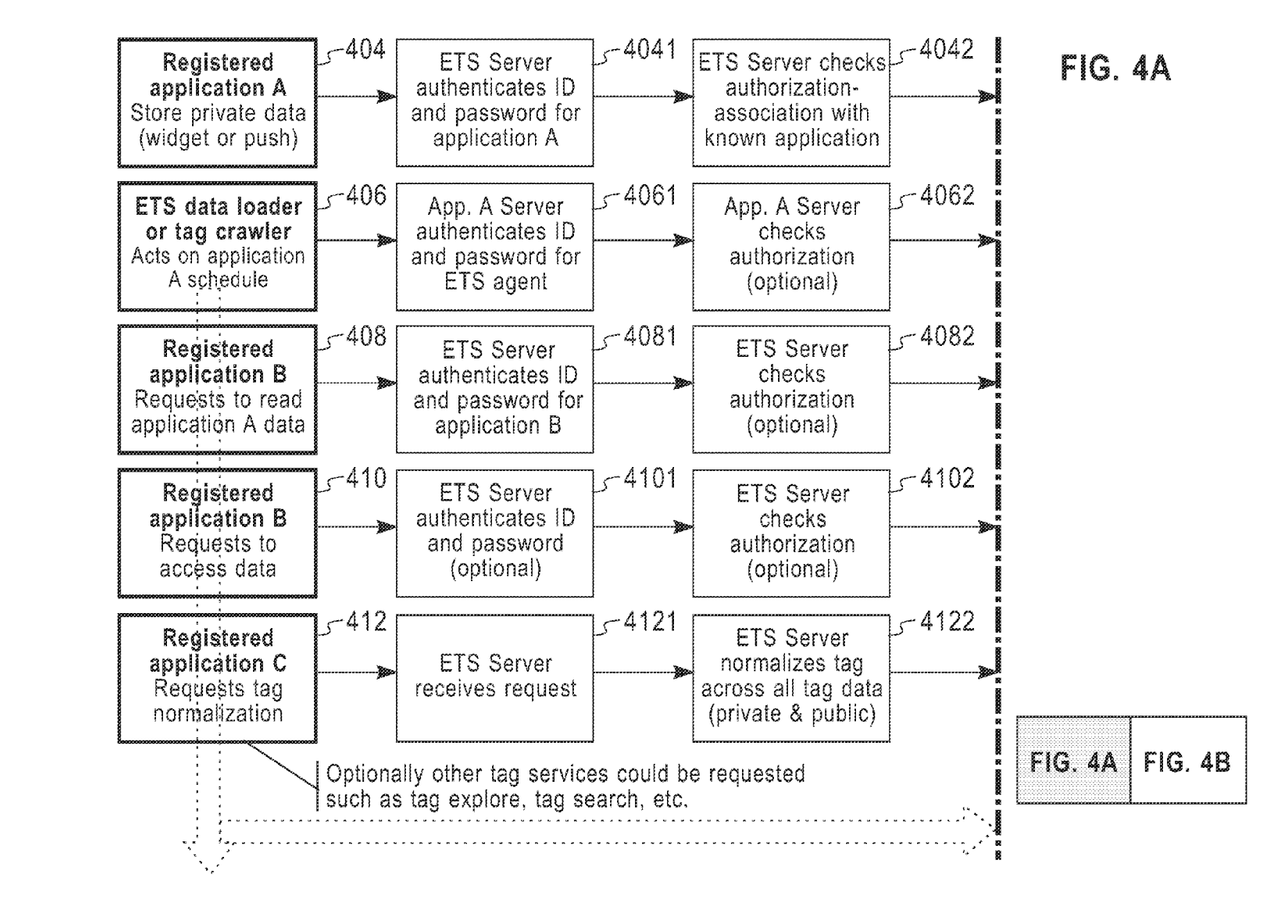
FIG. 4 shows an action flowchart for an Enterprise Tagging Service according to an embodiment of the present invention.
Figure 4B:
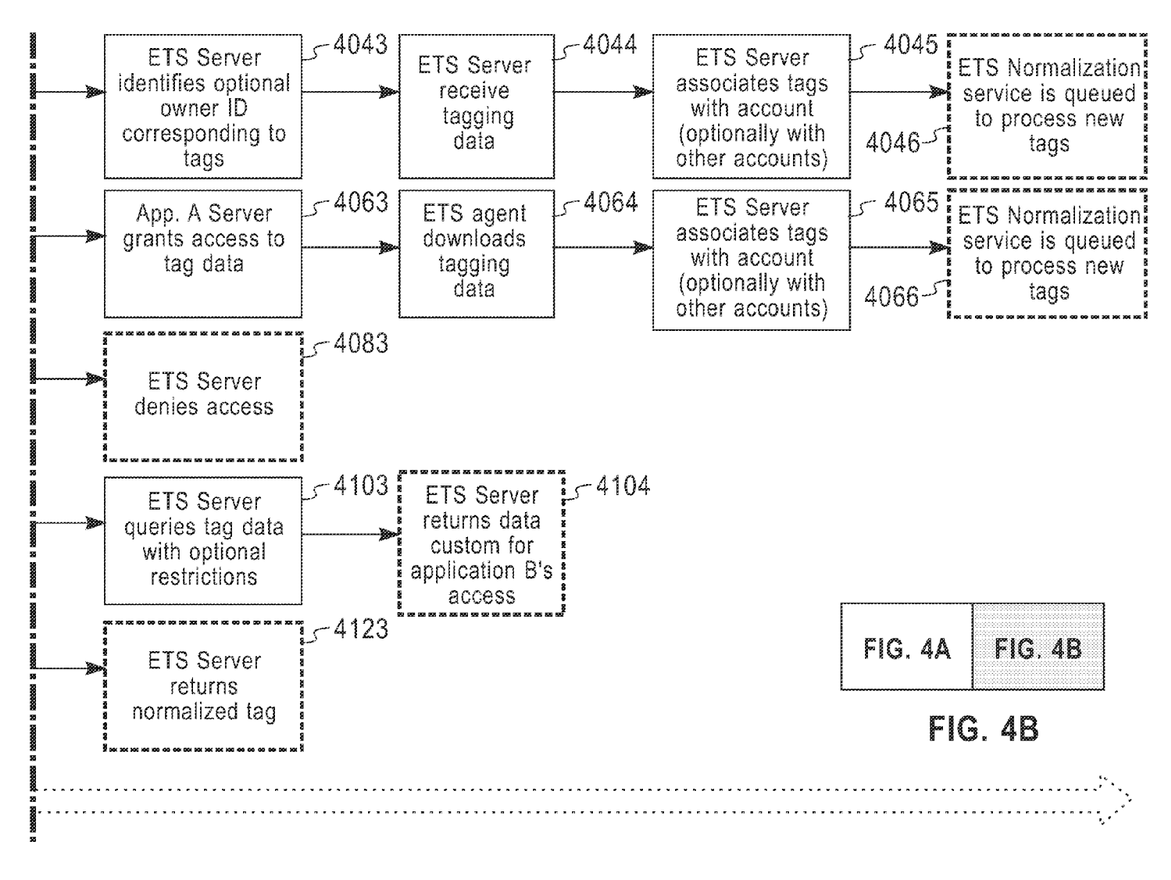

Another embodiment of the present invention includes actions for restricting data, see FIG. 4.

An application registered with ETS to keep its data private adds a tag to ETS repository and performs the following actions.

Action 404, Registered application A requests to store private data. This may be done via a widget, pushed data, etc.

Action 4041, ETS Server authenticates ID and password for application A.

Action 4042, ETS Server checks authorization—association with known application.

Action 4043, ETS Server identifies optional owner ID corresponding to tags.

Action 4044, ETS Server receives tagging data.

Action 4045, ETS Server associates tags with account. In another embodiment the associated tags may apply to multiple accounts.

Action 4046, ETS Normalization service is queued to process new tags. This step may be scheduled to run on a periodic basis. Optionally it can be queued on demand.

ETS loads tag data for remote application that has been registered to have its data loaded securely via the following actions.

Action 406, ETS data loader or tag crawler initiates a PULL of data from remote application A.

Action 4061, Application A Server authenticates ID and password for ETS agent.

Action 4062, Application A Server may check authorization.

Action 4063, Application A Server grants ETS agent access to its tag data.

Action 4064, ETS agent downloads Application A's tagging data.

Action 4065, ETS Server may associate tags with Application A in its repository.

Action 4066, ETS Normalization service is queued to process new tags. This step may be scheduled to run on a periodic basis. Optionally it can be queued on demand.

The following Application actions request to read tagging data from an application whose tagging data has been registered in ETS as private.

Action 408, Registered application B Requests to read application A data (via widget or API), see action 404.

Action 4081, ETS Server authenticates ID and password for application B.

Action 4082, ETS Server may check authorization. ETS Server checks the configured Read Access for Application A's data. It is private, so Application B should not be able to view it.

Action 4083, ETS Server denies access.

The following actions allow for Application requests access to tag data.

Action 410, Registered application B Requests to access data.

Action 4101, ETS Server may authenticates ID and password.

Action 4102, ETS Server may check authorization. This may occur as part of action 4101 or could be based upon security options such as domain, URL request address, etc.

Action 4103, ETS Server queries tag data with optional restrictions.

Action 4104, ETS Server returns data custom for application B's access.

The following actions occur when an Application requests a service (for example, a normalized version of a tag).

Action 412, Registered application C Requests tag normalization. The present invention allows for other tag services that could be requested, such as tag explore, tag search etc.

Action 4121, ETS Server receives request.

Action 4122, ETS Server normalizes tag across all tag data. This data may either private and/or public.

Action 4123, ETS Server returns normalized tag for registered application C.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this disclosure, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Additional embodiments of the present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 5:
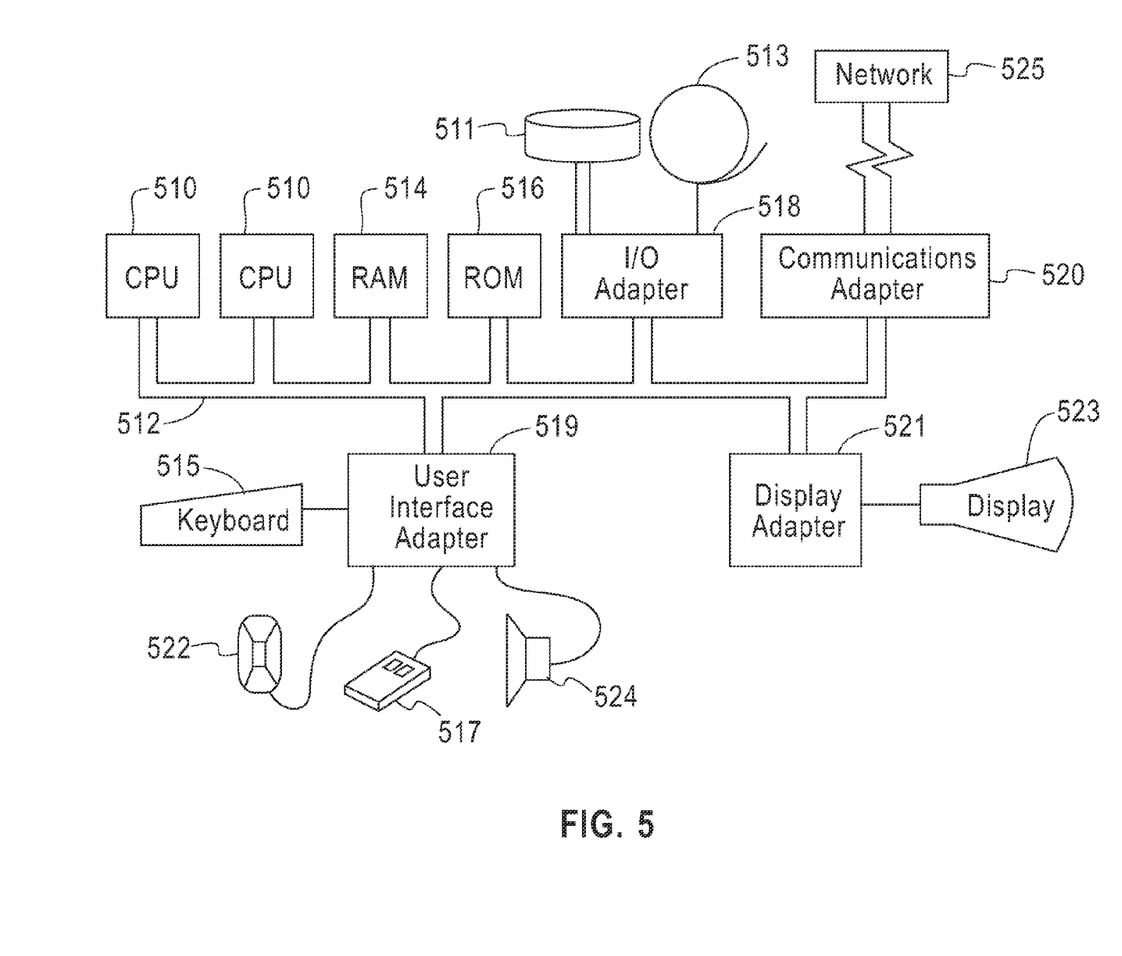
FIG. 5 shows a schematic that can be used for an Enterprise Tagging Service according to an embodiment of the present invention.

Referring now to FIG. 5, this schematic drawing illustrates a hardware configuration of an information handling/computer system in accordance with the embodiments of the invention. The system comprises at least one processor or central processing unit (CPU) 510. The CPUs 510 are interconnected via system bus 512 to various devices such as a random access memory (RAM) 514, read-only memory (ROM) 516, and an input/output (I/O) adapter 518. The I/O adapter 518 can connect to peripheral devices, such as disk units 511 and tape drives 513, or other program storage devices that are readable by the system. The system can read the inventive instructions on the program storage devices and follow these instructions to execute the methodology of the embodiments of the invention. The system further includes a user interface adapter 519 that connects a keyboard 515, mouse 517, speaker 524, microphone 522, and/or other user interface devices such as a touch screen device (not shown) to the bus 512 to gather user input. Additionally, a communication adapter 520 connects the bus 512 to a data processing network 525, and a display adapter 521 connects the bus 512 to a display device 523 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed:

1. A service for displaying custom information comprising:
    establishing, via a host system computer, a data connection to at least one data source, the at least one data source implemented by a website;
    receiving information via the data connection from the at least one data source;
    providing, by the host system computer, a data crawler to crawl tag data stored in the at least one data source using the information;
    using the information to assign tags, by the host system computer, to results of the crawl implemented by the data crawler;
    providing access to a widget via the website; and
    in response to access of a webpage of the website by an end user, presenting the tag data via the widget.

2. The service as claimed in claim 1 further comprising:
    normalizing the tag data prior to presenting the tag data to the end user.

3. The service as claimed in claim 1 wherein the results of the crawl implemented by the data crawler include at least one of a variety of data services prior to storage as tag data.

4. The service as claimed in claim 1 wherein the data connection is implemented via a web browser.

5. The service as claimed in claim 1 further comprising:
    updating a tagging database by normalizing incoming tags received from the end user, the normalizing implemented on a scheduled, periodic basis.

6. The service as claimed in claim 1 further comprising:
    updating a tagging database by normalizing incoming tags received from the end user, the normalizing implemented on demand via a request by the website.

7. A service for displaying custom information comprising:
    establishing, via a host system computer, a data connection to at least one data source, the at least one data source implemented by a website;
    registering the website via the data connection;
    receiving information from the registered website via the data connection;
    providing, by the host system computer, a data crawler to crawl tag data stored in the at least one data source using the information;
    providing access to a widget via the website; and
    in response to access of a webpage of the website by an end user, presenting the tag data via the widget.

8. The service as claimed in claim 7 wherein registering the website includes registering a tag feed of the website, the tag feed comprising an instance of at least a portion of the tag data of a remote application of the website, the tag data collected by the remote application;
    wherein the data crawler crawls the at least one data source using the tag feed.

9. The service as claimed in claim 8, further comprising:
    aggregating the tag data across multiple third party websites and corresponding data sources; and
    normalizing the tag data across the multiple third party websites.

10. The service as claimed in claim 9, further comprising:
    storing the tag data from the multiple third party websites in a single repository, the tag data partitioned by a website identifier assigned to each of the third party websites.

11. A system for displaying custom information comprising:
    a data source configured to store information, the data source implemented by a website;
    a host system computer, the host system computer providing access to a widget via the website;
    an application configured to execute on the host system computer, the application having access to the data source via a data connection;
    a data crawler provided by the host system computer, the data crawler configured to crawl tag data stored in the data source using the information, the application using the information to assign tags to results of the crawl by the data crawler; and
    a display element configured to display the tag data via the widget.

12. An apparatus for an enterprise tagging service, the apparatus comprising:
    a host system computer;
    an application configured to execute on the host system computer, the application establishing a data connection to at least one data source, the at least one data source implemented by a website, the application implementing a method, comprising:
    receiving information via the data connection from the at least one data source;
    providing a data crawler to crawl tag data stored in the at least one data source using the information;
    using the information to assign tags to results of the crawl implemented by the data crawler;
    providing access to a widget via the website; and in response to access of a webpage of the website by an end user, presenting the tag data via the widget.

13. A computer program product comprising a non-transitory storage medium embodied with program instructions, which when executed by a host system computer cause the host system computer to implement a method, the method comprising:

establishing a data connection to at least one data source, the at least one data source implemented by a website;

receiving information via the data connection from the at least one data source;

providing a data crawler to crawl tag data stored in the at least one data source using the information;

using the information to assign tags, by the host system computer, to results of the crawl implemented by the data crawler;

providing access to a widget via the website; and in response to access of a webpage of the website by an end user, presenting the tag data via the widget.

* * * * *